(No Model.) 2 Sheets—Sheet 1.
G. LISSENDEN.
GANG PLOW.
No. 273,292. Patented Mar. 6, 1883.
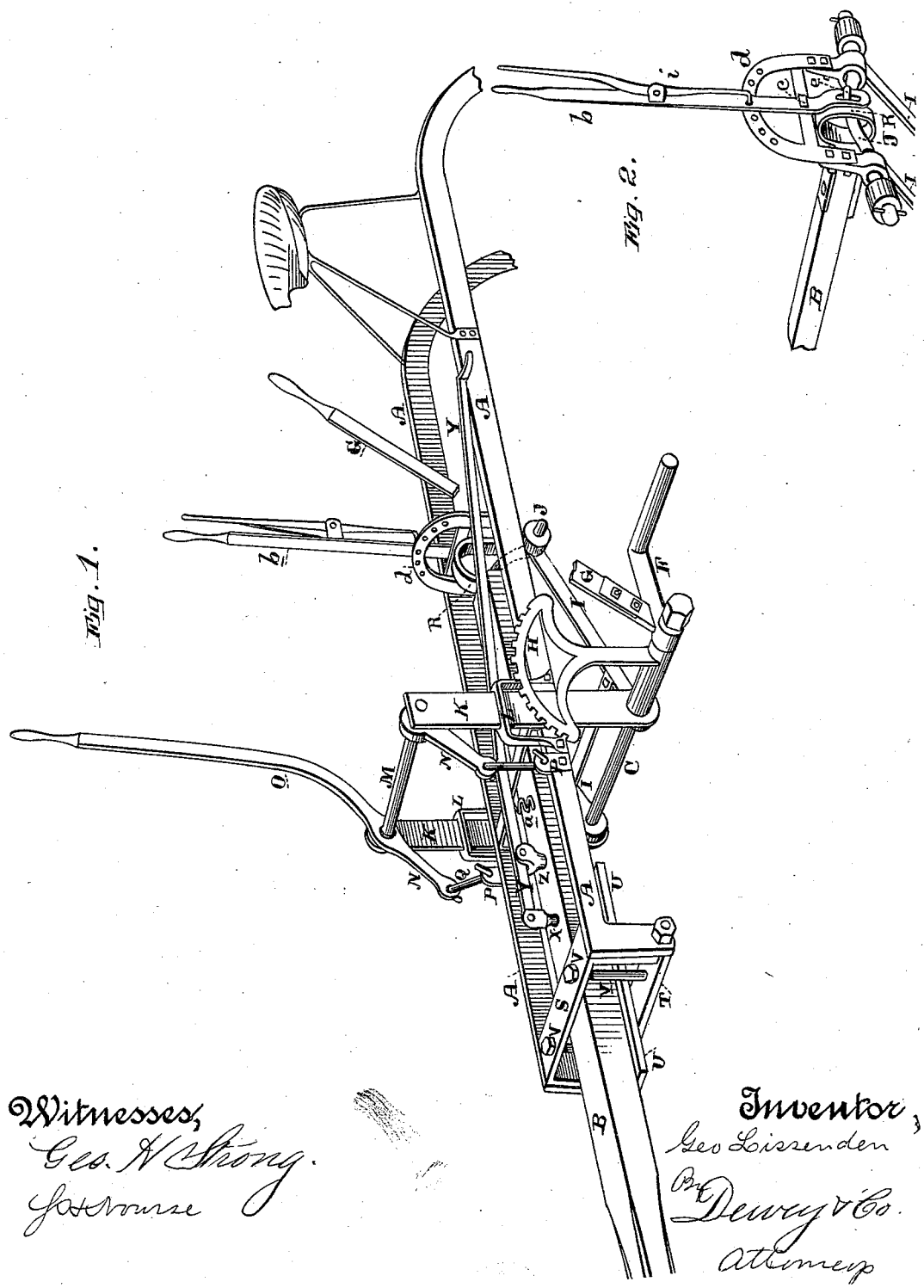
Witnesses,
Geo. N. Strong.
J. H. Nourse
Inventor,
Geo. Lissenden
By Dewey & Co.
Attorneys

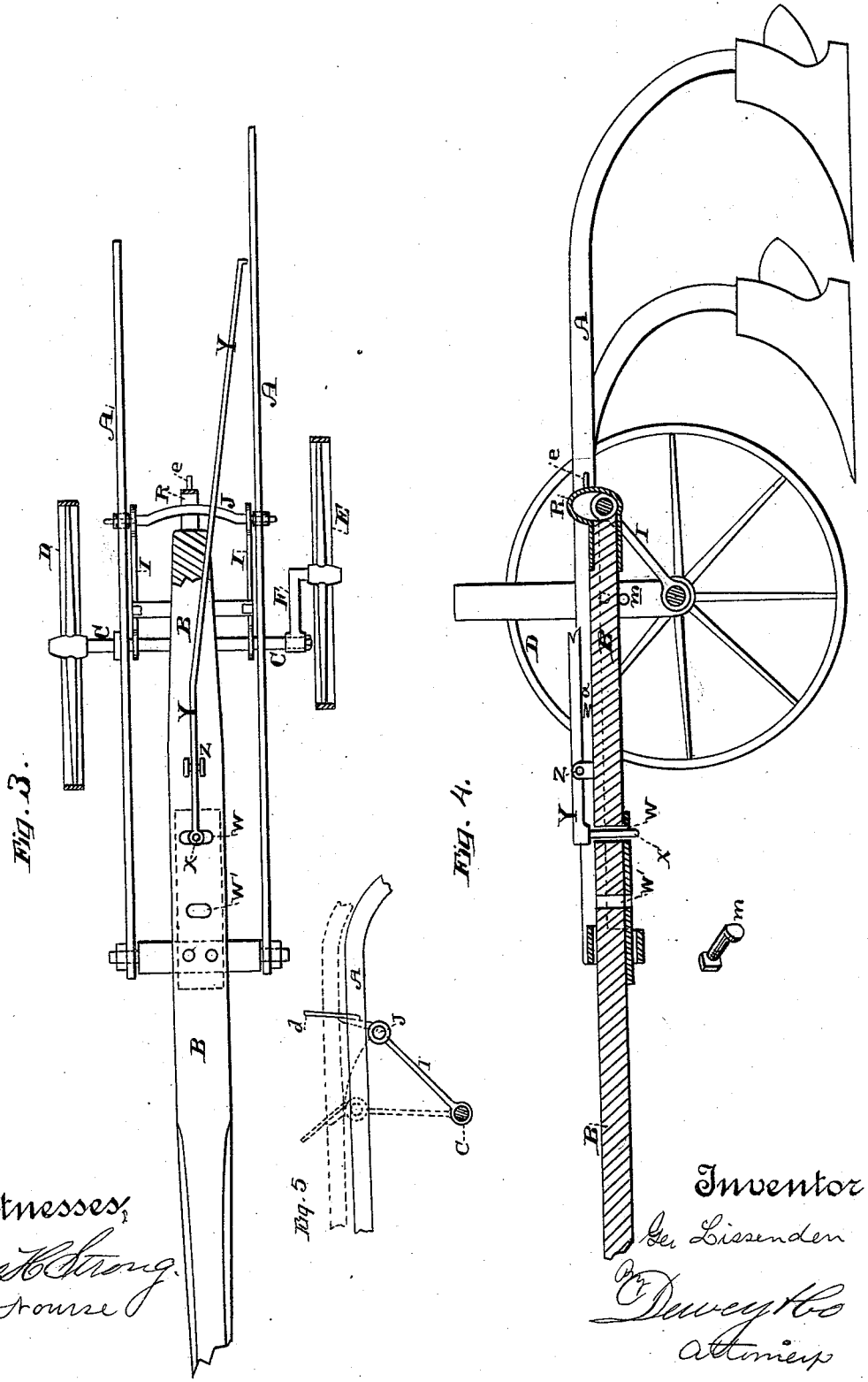

UNITED STATES PATENT OFFICE.

GEORGE LISSENDEN, OF STOCKTON, CALIFORNIA.

GANG-PLOW.

SPECIFICATION forming part of Letters Patent No. 273,292, dated March 6, 1883.

Application filed November 6, 1882. (No model.)

*To all whom it may concern:*

Be it known that I, GEORGE LISSENDEN, of Stockton, county of San Joaquin, State of California, have invented an Improved Gang-Plow; and I hereby declare the following to be a full, clear, and exact description thereof.

My invention relates to certain improvements in sulky or gang plows; and it consists of a novel mechanism by which the plow-frame is connected with and supported upon the wheel-axles, of a draft-pole and its connection with the plow-frame, and of a lever, connecting-arms, and standards, whereby the plows may be raised out of the ground or let down to the proper depth.

It also consists in means for connecting the pole with the frame of the plows, and an adjusting mechanism for its rear end, which is so connected as to travel forward and back with the pole with relation to the frame, together with the means for supporting the whole upon the wheels, by which the plows will hold their position in the land and make an equal cut in land of variable quality and hardness.

Referring to the accompanying drawings for a more complete explanation of my invention, Figure 1 is a perspective view of my plow, with the wheels removed to show the position of the working parts. Fig. 2 is a view of the rear end of the pole with its side adjustments. Fig. 3, Sheet 2, is a plan view of the plow. Fig. 4, Sheet 2, is a longitudinal vertical section taken through the pole. Fig. 5 shows the manner of raising the plow-beams.

A A are the plow-beams, having the plows secured to their rear ends in the usual manner.

B is the pole; and C is the axle, upon the right end of which the furrow-wheel D is placed directly.

The land-wheel E is mounted upon a cranked axle, F, which is attached to the axle C by a sleeve, so as to turn about the axle. The cranked arm stands back of the axle C, so that the land-wheel E is always behind the axle and the line of the furrow-wheel, instead of standing forward of it, as in the usual construction of this class of plows.

The plow-frame is made long, and this, with the method of mounting the wheels, serves to hold the plows to the land in both soft and hard soil without the necessity of setting the plows themselves at an angle with the frame.

A lever, G, is fixed to the sleeve of the cranked axle, and is employed to raise or lower the land-wheel, and thus regulate the depth of the furrow. A rack, H, is engaged by this lever, and holds it at any desired point.

I I are two arms, which are fixed to the axle C, and extend upward and backward to the plow-beams, and at that point is a shaft, J, which extends across beneath the beams, with thimbles on each end, so as to move freely along the lower surfaces of the beams when the arms are thrown forward to raise the beams. These crank-arms I are attached to the ends of this shaft, as shown, and when they move forward about the axle the plow-beams are at the same time raised so as to take the plows out of the ground.

Two standards, K, are fixed to the axle, and extend up through guides L upon the sides of the beams, being united by a transverse shaft, M, at the top. Two arms, N, are keyed to this shaft, extending downward and forward, and one of them is continued upward above the shaft to form the lever O, by which they are moved. The lower ends of these arms N are connected with lugs P upon the plow-frame by links Q, so that when the lever O is pulled back the arms N will lift the plow-beams, the fulcrum-shaft M being supported from the wheel-axle C by the standards K. It is not intended, however, to lift the plows entirely by this mechanism, but to use it simply as a starter or assistant. The principal work is done by the pole B, acting upon the backwardly-inclined crank-arms I I. This pole extends backward between the plow-beams, and has a stout arched piece, R, fixed to its rear end, through which the transverse shaft J, which is connected with the arms I, may pass, so that while the shaft turns freely within the arch R the pole may act upon it when desired to draw the shaft forward and upward about the axle as a center or fulcrum. At the front end of the frame the pole passes between two horizontal plates, S and T, above and below it, the upper one having its ends turned down so as to unite with the lower one, T, as shown in Fig. 1. This lower plate has its ends formed into journals, which turn in holes made through the sides of the beams, being held in place by nuts upon the outer ends, or otherwise. This allows the plate to turn upon these journals, and thus adjust itself to the slight changes which the pole makes with relation to the beams.

A plate, U, is secured to the transverse plate T, and extends longitudinally beneath the pole, so that the pole may slide upon it during its movements forward or back.

Two bolts, V, pass vertically through the plates S and T, leaving space enough for the pole to slide between them, and each bolt has a loose sleeve or roller surrounding it to prevent wear upon the pole and reduce friction.

Two holes, W W', are made in the longitudinal plate U, upon which the pole slides, into either of which the pin X, which passes through the pole, may fall when brought above them. This pin is attached to the end of a lever, Y, which has its fulcrum at Z upon the pole, and extends back to a point where the driver may reach the end with his foot while he sits upon the seat. A spring, $a$, beneath this part of the lever keeps it up and presses the pin X down, so that it will enter either hole in the plate when it arrives opposite to it, and thus arrest the movement of the pole.

The operation of this mechanism is to raise the plows out of the ground when desired, and principally by direct draft upon the pole. It is as follows: When the plows are in the ground the arms I I incline backward at a considerable angle, and the plow-beams are supported upon stops $m$ upon the inner sides of the standards K. (See Fig. 4.) By making the head of the stop eccentric and fast to its bolt the nut upon the outside may be loosened, and the bolt turned around so as to lower the stop, which allows the beams to drop somewhat lower when laying out land preparatory to plowing. The pin X, passing through the pole into the plate U, unites the pole and plow-beams, so that the draft upon the pole is transferred to the plow-beams and plows. When it is desired to elevate the plows out of the ground the driver lifts the pin X out of the plate U. This allows the pole to move forward, and the strain of the draft is thrown upon the shaft J by means of the arched piece R, which incloses it, and which is secured to the rear end of the pole. At the same time the lever O is pulled back, and its action raises the beams, giving them a start, and the operation is completed by the forward movement of the pole until the plows are clear of the ground, when the pin X will fall into the hole W' in the plate U, and hold the beams and plows up. Whenever it is desired to let the plows down again, it may be done at the end of a furrow in turning, or when the team is stopped and the strain of the draft is relieved by withdrawing the pin X, when the weight of the plows, frame, and driver will be sufficient to depress them again to take the ground, or, if the team is in motion, lift on the lever O, and the same result will be produced. The pin will fall into the rear hole in the plate U when it arrives at that point and the proper depth has been attained; and when the land-wheel has once been adjusted for the depth of furrow desired the plow may be run by a comparatively unskilled person or a boy, as the stops on the standards K are adjusted to stop the plows on a level with the furrow-wheel. The weight is so well balanced that when the pin X is withdrawn from the plate U it needs but a slight pull upon the lever O to start the plows, so that the draft upon the pole will throw them out of the ground, or when the draft is slackened they will again drop and take the ground if released.

The driver's seat is placed at the rear of the plow-beams, and just over the plows, so that all the levers are in front and within easy reach, and his weight is utilized to hold the plows down in hard ground.

The work of the plows can be seen by looking down in front and without turning around, as must be done when the plows are behind the seat. The rear end of the pole is allowed a certain amount of vertical motion by the arch R, loosely inclosing the shaft J, which allows it to move independently of the plow-beams upon uneven surfaces.

In order to change the angle of the pole with reference to the plow-beams, and give the plows more or less land, I employ the lever $b$, which has its fulcrum-pin $c$ fixed to the lower part of the arc or rack $d$. This arc has the sides extended downward and connected with the arms I, while the lower end of the lever connects with a pin, $e$, upon the rear part of the arch R, so that when the lever is moved to right or left it gives the rear end of the pole a corresponding movement in the opposite direction, the usual pawl, $i$, serving to engage the teeth of the rack and hold the lever wherever desired. The pole moves between the vertical pins V V at the front as a fulcrum, and the holes through which the pin X passes are sufficiently elongated transversely to allow the movement of the pole without interfering with the action of the pin.

It will be seen that by connecting the lever and rack with the rear end of the pole and with the arms I this mechanism is made to move back and forward with the pole, instead of remaining stationary, and the side adjustment of the pole may be made at any time, whatever may be its position.

I am aware that a sliding tongue has been employed to communicate the draft to the plows, and thereby raise them from the ground; neither do I claim the same, broadly, as my invention; but

What I claim as new, and desire to secure by Letters Patent, is—

1. The plow-beams A and the wheel-axle C, with the arms I, extending backward, and the shaft J, connecting these arms with the beams, in combination with the standards K, shaft M, arms N, links Q, and lever O, substantially as herein described.

2. The plow-beams A, the axle C, with the arms I and shaft J, and the standards K, arms N, and lever O, in combination with the sliding pole B, having its rear end connected with the shaft J, and a mechanism by which it may be united to or detached from the beams, substantially as herein described.

3. The plow-beams A, connected with the axle C by the arms I, standards K, levers N, and links, as shown, and the independent sliding pole B, united at the rear end with the shaft J, in combination with the perforated plate U, connected with the front of the plow-frame A, and the pin X, lever Y, and spring $a$ upon the pole, substantially as herein described.

4. The beams A, connected with the axle C by the arms I, standards K, and levers N, as shown, and the longitudinally-sliding pole B, having its rear end connected with the shaft J by the open box R, in combination with the plates S and T, uniting the front ends of the beams, the plate U, and the vertical pins V with their anti-frictional sleeves upon each side of the pole, substantially as herein described.

5. The beams A and the longitudinally-sliding pole B, the rear end of which has a vertical movement independent of the beams by means of the open box or arch R, through which the shaft J passes, in combination with the transverse rocking plates S T and the longitudinal supporting-plate U, fixed to the plate T so as to support the pole and conform to its movements, substantially as herein described.

6. The plow-frame A A, supported from the axle C by the arms I, levers N, and standards K, the sliding pole B, and connecting mechanism whereby the plow-frame and plows may be elevated or depressed by the movement of the pole, in combination with the transverse adjusting-lever $b$ and arc or rack $d$, attached to and moving forward and back with the rear end of the pole, and the shaft J, and arms I, substantially as herein described.

7. The plow-beams A, connected with the axle C by the backwardly-inclined arms I, and the standards K, arms N, and links Q, and the sliding pole B, having the open arch or box R, inclosing the shaft J at the rear, and the lever Y, with its connecting and disconnecting mechanism, in combination with the crank-arm F, carrying the wheel E, and projecting to the rear of the axle C, the lever G, and the rack H, substantially as herein described.

8. In a sulky-plow having the beams A, supported from the axle, the sliding pole B, with the lever $b$, attached to and moving with the pole, and the operating-levers O, G, and Y, as shown, the seat $m$, supported upon the rear ends of the plow-beams and above the plows, substantially as and for the purpose herein described.

9. In a sulky-plow, the plow-beams A, supported from the axle by the inclined arms I, and the arms N from the standards K, in combination with the sliding pole B, connected with the arms I so as to raise or lower the plows, and the adjustable stops $m$ upon the standards K to support the beams, substantially as herein described.

In witness whereof I hereunto set my hand.

GEORGE LISSENDEN.

Witnesses:
J. H. MILLER,
WM. C. HYDE.